United States Patent
Mathiesen et al.

(12)
(10) Patent No.: US 6,402,203 B1
(45) Date of Patent: Jun. 11, 2002

(54) FLANGE CONSTRUCTION FOR FABRIC EXPANSION JOINTS

(75) Inventors: Benny Mathiesen, Middelfart (DK); David F. McGrath, Garden Ridge; Michael Wayne Pollock, New Braunfels, both of TX (US)

(73) Assignee: Senior Investments AG, Shaffhausen (CH)

( * ) Notice: Subject to any disclaimer, the term of this patent is extended or adjusted under 35 U.S.C. 154(b) by 0 days.

(21) Appl. No.: 09/663,464

(22) Filed: Sep. 15, 2000

(51) Int. Cl.[7] ............................................... F16L 27/12
(52) U.S. Cl. ........................................ 285/299; 285/224
(58) Field of Search ................................ 285/224, 226, 285/299, 300, 301; 92/34, 47

(56) References Cited

U.S. PATENT DOCUMENTS 2,752,172 A * 6/1956 Ziebold ...................... 285/226
4,712,938 A * 12/1987 Seshamani et al. ......... 285/224
6,131,955 A * 10/2000 Bachmann et al. ......... 285/300

* cited by examiner

*Primary Examiner*—Lynne H. Browne
*Assistant Examiner*—Aaron Dunwoody
(74) *Attorney, Agent, or Firm*—Dick and Harris

(57) ABSTRACT

An expansion joint for high temperature air or other gaseous flows, of the type in which two duct ends are separated by a gap, that is bridged by a flexible fabric expansion joint cover. The flexible fabric expansion joint cover is attached to the duct ends, using two outwardly extending frame members. Each frame member incorporates one or more convolutions, that are provided to accommodate thermally inducted stresses and strains, imposed by the thermal gradient through the frame members, from positions proximate the duct ends, to outwardly disposed locations where the frame members are attached to opposing ends of the fabric cover.

18 Claims, 3 Drawing Sheets

FLANGE CONSTRUCTION FOR FABRIC EXPANSION JOINTS

BACKGROUND OF THE INVENTION

1. Field of the Invention

The present invention is directed to constructions for expansion joints for ducting, for example, such as may be used for the exhaust for large stationary gas turbines for the generation of electrical power, and for other ducting environments, especially those involving high temperature and/or substantial flow pulsations or turbulent flow.

2. Prior Art

Ducting which is used to transport air or other gaseous flows that are subject to substantial pulsations or turbulent flow or wide variations in pressure or flow rate, or which has wide variations in temperature range, typically must be provided with expansion joints that will enable the ducting to expand or contract to accommodate such dimensional variations as may be caused by extremes of pressure or temperature variation. In addition, if the ducting is connected to an air or other gaseous flow source that is pulsating, vibrating or in some other form of movement, expansion joints are also necessary in order to accommodate such dimensional changes or movements, without transmitting the stresses, vibrations or movements along the ducting. Otherwise, the ducting might be subject to leakage or failure entirely.

One example of an environment in which such ducting is necessary is that of a stationary gas turbine that is used for electrical power generation. Expansion joints for ducting for gas turbines must be able to accommodate relative axial movements of the duct ends on opposite side of the joint, as well as relative vertical and/or horizontal movements of the duct ends. In addition, such expansion joints must be able to accommodate high temperature gas flows (often in excess of 1000° F. at the center of the gas flow).

A joint for use with ducting such as used in association with such moving air or other gaseous flow sources is typically formed by creating a gap in the ducting (which ducting typically may be round or rectangular in cross-section). Inner and outer liner duct structures are then affixed to the opposing duct ends. The inner and outer liner duct structures are typically in overlapping telescopic relation to one another, with the inner liner duct structures on the upstream side of the joint. In this way, the force of the gas flow, during ordinary operating conditions, has less of a tendency to drive the gases between the overlapping portions of the inner and outer liner duct structures. A relatively close fit between the overlapping portions is provided, so that the impact of high-magnitude pulsations or turbulent flow in the air or other gaseous fluid flow, on the remaining surrounding expansion joint structure, is reduced.

To create the fluid-tight seal for the expansion joint, a high-temperature flexible fabric belt is provided to create the flexible outer skin of the expansion joint, connecting the portions of the duct on opposite sides of the gap.

This fabric belt is typically bolted to the opposing duct ends, to flanges that extend outwardly from the duct ends. Typically these flanges are fabricated from steel. These flanges are exposed to the temperatures of the gas flow. In particular, they are exposed to rapid temperature increases, e.g., at the start up of the gas turbine, and can develop tremendous thermal stresses (thermally caused expansion and contraction) that can result in cracking after only a few cycles.

Accordingly, it would be desirable to provide a means for reducing degradation of the fabric expansion joint belt attachment flanges, due to thermal stresses arising from thermal cycling.

This and other desirable characteristics of the present invention will become apparent in view of the present specification, including claims, and drawings.

SUMMARY OF THE INVENTION

The present invention is directed, in part, to an expansion joint for flexibly connecting first and second duct ends, the expansion joint having a longitudinal axis and a periphery.

The expansion joint comprises a first frame member, operably connected to, and circumferentially surrounding at least a portion of the first duct end. The first frame member further extends outwardly from the first duct end. The first frame member includes a first attachment web disposed adjacent the first duct end, a flange extending substantially away from the first duct end, and a second attachment web disposed at a position removed from the first duct end, the flange joining the first and second attachment webs.

A second frame member is operably connected to, and circumferentially surrounding at least a portion of the second duct end. The second frame member further extends outwardly from the second duct end. The second frame member includes a first attachment web disposed adjacent the second duct end, a flange extending substantially away from the second duct end, and a second attachment web disposed at a position removed from the second duct end, the flange joining the first and second attachment webs.

A flexible sealing cover peripherally circumferentially surrounds the gap between the first and second duct ends, and affixed to the second attachment webs of the first and second frame members, substantially sealingly connecting the first duct end to the second duct end. At least one of the flanges of at least one of the first and second frame members is provided with at least one convolution therein, for accommodating stresses and strains induced in the respective at least one of the first and second frame members, and permit flexing of said respective at least one of the first and second frame members.

In a preferred embodiment of the invention, the at least one convolution projects substantially longitudinally substantially parallel to the longitudinal axis of the expansion joint.

Preferably, the at least one convolution proceeds circumferentially through the at least one of the first and second frame members.

In an alternative embodiment of the invention, the at least one convolution comprises two or more convolutions in at least one of the first and second frame members.

At least one of the first and second frame members may be monolithically formed. Alternatively, at least one of the first and second frame members is fabricated from separate first and second attachment web members and a flange member.

Preferably, at least one of the first and second frame members has a configuration selected from the following group: rectangular, polygonal, circular, oval.

In an embodiment of the invention, at least one of the first and second frame members generally extends in a plane perpendicular to the longitudinal axis of the expansion joint. In an alternative embodiment of the invention, at least one of the first and second frame members generally extends in a plane oblique to the longitudinal axis of the expansion joint.

The present invention also is directed, in part, to a frame member construction for supporting an end of a fabric expansion joint belt, for an expansion joint for a gas duct of the type wherein first and second duct ends are connected to first and second frame member, each frame member having a first attachment web disposed adjacent a respective duct end, a flange extending substantially away from the respective duct end, and a second attachment web disposed at a position removed from the respective duct end, the flange joining the first and second attachment webs, and wherein end edges of the fabric expansion joint belt are affixed to respective second attachment webs of the first and second frame members. The frame member construction comprises at least one convolution formed in the flange joining the first and second frame members.

In this component of the invention, accordingly to a preferred embodiment of the invention, the at least one convolution projects substantially longitudinally substantially parallel to the longitudinal axis of the expansion joint.

Preferably, the at least one convolution proceeds circumferentially through the frame member.

In an alternative embodiment of the invention, the at least one convolution comprises two or more convolutions in the frame member.

According to one embodiment of the invention, the frame member is monolithically formed. Alternatively, the frame member may be fabricated from separate first and second attachment web members and a flange member.

Preferably, the frame member has a configuration selected from the following group: rectangular, polygonal, circular, oval.

In an embodiment of the invention, the frame member is operably configured to be connected to a duct end and extend generally in a plane perpendicular to a longitudinal axis of the duct end.

In an alternative embodiment of the invention, the frame member is operably configured to be connected to a duct end and extend generally in a plane oblique to a longitudinal axis of the duct end.

DETAILED DESCRIPTION OF THE DRAWINGS

Figure 1:
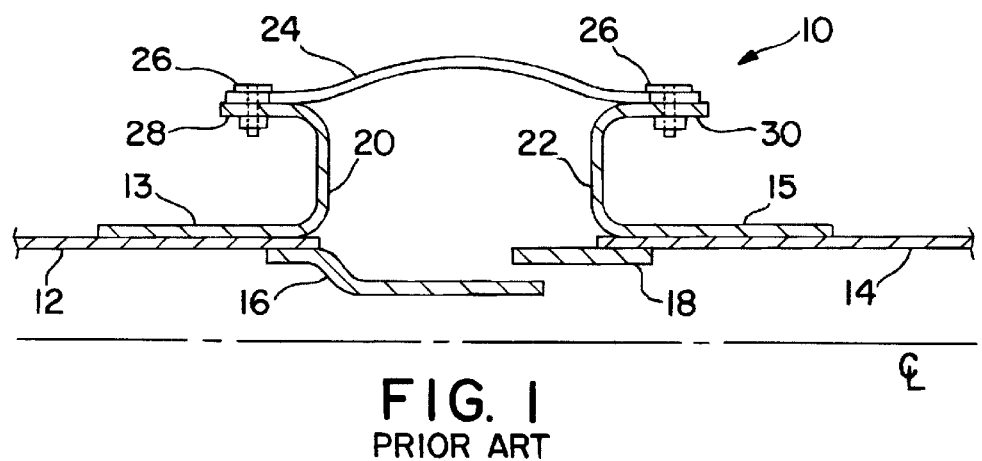
FIG. 1 is a side elevation, in section, of a prior art fabric expansion joint for a high temperature gas flow conduit, such as may be used in a gas turbine conduit system.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

Figure 2:
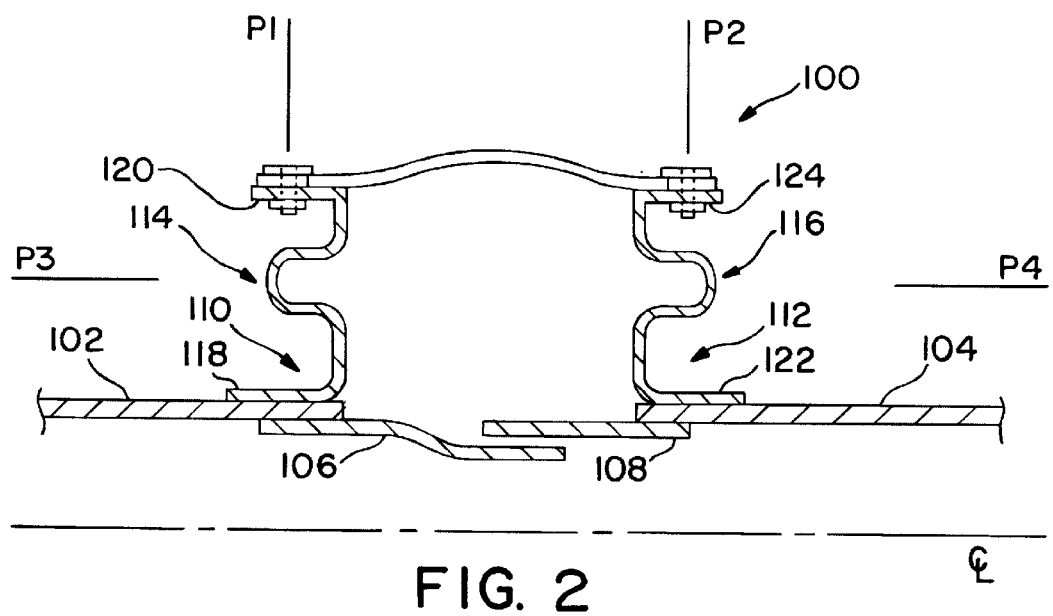
FIG. 2 is a side elevation, in section, of a fabric belt expansion joint, employing attachment flanges in accordance with the principles of the present invention.

FIGS. 1 and 2 illustrate a prior art expansion joint, and an embodiment of the present invention, respectively. In each Figure, only a longitudinal or side cross-section of an upper half of each respective expansion joint is shown as reflected in the depiction of the centerline in each Figure. It is to be understood that the lower half of each expansion joint may be identical in configuration, to the illustrated upper half. In addition, it is to be understood that if each expansion joint were to be shown as a top or bottom section, that the respective structures would likewise be substantially similar if not identical.

In a preferred embodiment, one or both frame members may be formed as a continuous frame member configured to extend around the circumference of its respective duct end, and with a substantially uniform continuous longitudinal cross-section.

FIG. 1 illustrates a prior art expansion joint for a high temperature gas duct, such as are employed with gas turbine ducting systems. Expansion joint 10 connects duct ends 12 and 14. Frame members 13, 15 are affixed, such as by welding, bolting, etc., to duct ends 12, 14, respectively. Liner tube members 16, 18 are provided, and may be affixed, e.g., by welding, to duct ends 12, 14, respectively. Liner tube members 16, 1 8 serve to protect belt 24, from direct onslaught of the hot gases, and, in part, to direct the flow of gas e.g., from duct end 12 to duct end 14 (typically, but not always, the inner liner tube member is the "upstream" liner tube member). Frames 13, 15, include flanges 20, 22, that extend radially outwardly. Fabric expansion joint belt 24 is typically connected, e.g., by bolting, and using an outer backing flanges 26, to longitudinally extending webs 28, 30, to provide a substantially gas-tight seal for expansion joint 10.

Typically, fabric expansion joint belt 24 is fabricated in whole or in substantial part of PTFE (polytetrafluoroethylene, often sold under the mark TEFLON®). This material is well known to be susceptible to sudden and total degradation, if exposed to temperatures even slightly in excess of 700° C.

Accordingly, it is often desirable to make the radial height of radially extending flanges 20, 22 as high as possible, to maximize the standoff distance for belt 24. However, the thermal gradient to which flanges 20, 22 are exposed increases with the radial height of those flanges. With such increased thermal gradient, the thermally induced stresses and resulting strains imposed on flanges 20, 22 can result in destructive cracking in relatively few cycles. Reduction in the radial height of the flanges 20, 22 results in less thermal gradient, but in turn exposes belt 24 to higher absolute temperatures. Balancing these two considerations can be extremely difficult, if not nearly impossible, when considering other functional requirements in any given application.

FIG. 2 illustrates an embodiment of the present invention that is configured to address these conflicting requirements and considerations. Expansion joint 100 connects two duct ends 102, 104. Liner tubes 106, 108 extend from duct ends 102, 104, and may be affixed, e.g. by welding, and may function in a substantially similar manner to the liner tubes of the prior art embodiment of FIG. 1.

Frames 110, 112 are affixed to (e.g., by welding) and extend from duct ends 102, 104. Instead of simple radially extending flanges, frames 110, 112 are each provided with one or more convolutions 114, 116, disposed between longitudinal webs 118, 120, and 122, 124, respectively. Fabric expansion joint belt 126, like belt 24 of the prior art construction, typically and preferably is constructed in whole or in part of PTFE, and may be connected to webs 120, 124, by bolting and using backing flanges 128, in the manner previously described.

Figure 3:
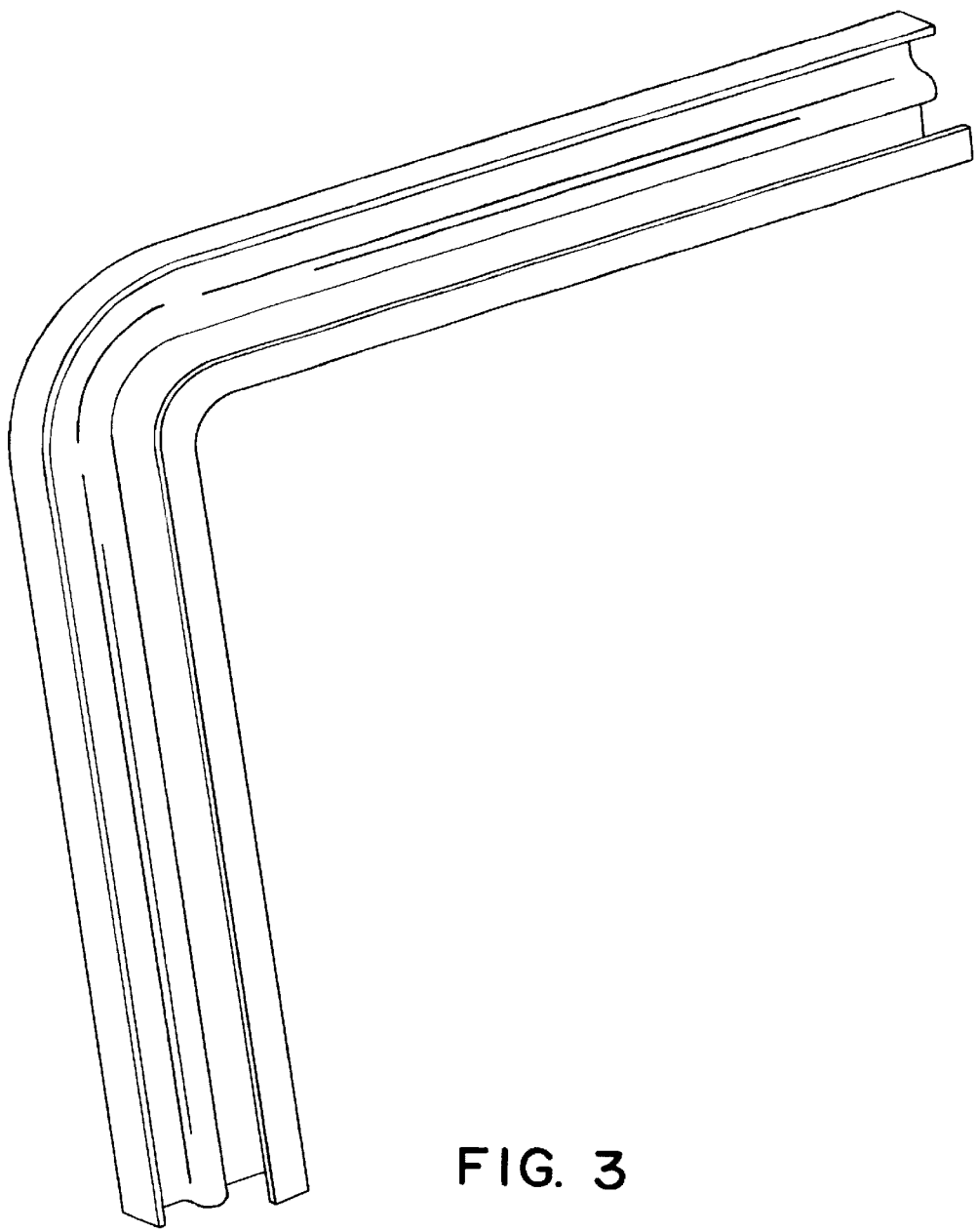
FIG. 3 is a perspective view of a fragment of a frame member, in accordance with the principles of the present invention, with a circumferentially extending convolution.

In a preferred embodiment of the invention, convolutions 1 14, 1 16 are formed as one piece with their respective adjacent webs 1 18, 120, and 122, 124. That is, each of frames 110, 112 is monolithically formed, and thus of substantially homogeneous thickness, throughout the respective sections. In addition, in a preferred embodiment of the invention, each of frames 110, 112 is formed as a generally rectangular frame structure, that proceeds around the entire circumference of the expansion joint. FIG. 3, for example, illustrates a corner of frame 110. It can be seen that convolution 114 proceeds through the corner and into a vertically extending portion of frame 110. Frame 110 is shown as having a rounded corner (with like rounded corners at each vertical/horizontal junction), preferably, because this produces a more uniform distribution of stresses through the corner (as compared, e.g., to a sharp right-angled turn). In addition, such a rounded corner structure may be less expensive and easier to create with presently available known manufacturing techniques.

Alternatively, one or both of frames 110, 112, may be formed from several components, such as two rigid frame components that are circumferentially extending hoops, that have right-angle "L"-shaped cross-sections, joined to a convolution member. Seam welds may join the several components. In such an embodiment, because separate components are assembled, the web thicknesses of the rigid frame components may be of different (e.g., thicker) thickness than the convolution member.

Each of frames 110, 112 is shown in FIG. 2, with a single, longitudinally projecting, circumferentially proceeding convolution. However, in alternative embodiments of the invention, two or more such convolutions may be employed in each frame.

By providing the circumferentially extending convolution(s) in each frame, substantial flexibility is provided in each flange that accommodates the thermally induced stresses and strains that would otherwise be created by high-temperature gases passing through the expansion joint. The convolutions permit the radial "height" of frames 110, 112 to be substantially greater than that permitted with solid, non-convoluted, substantially rigid prior art frames.

Figure 4:
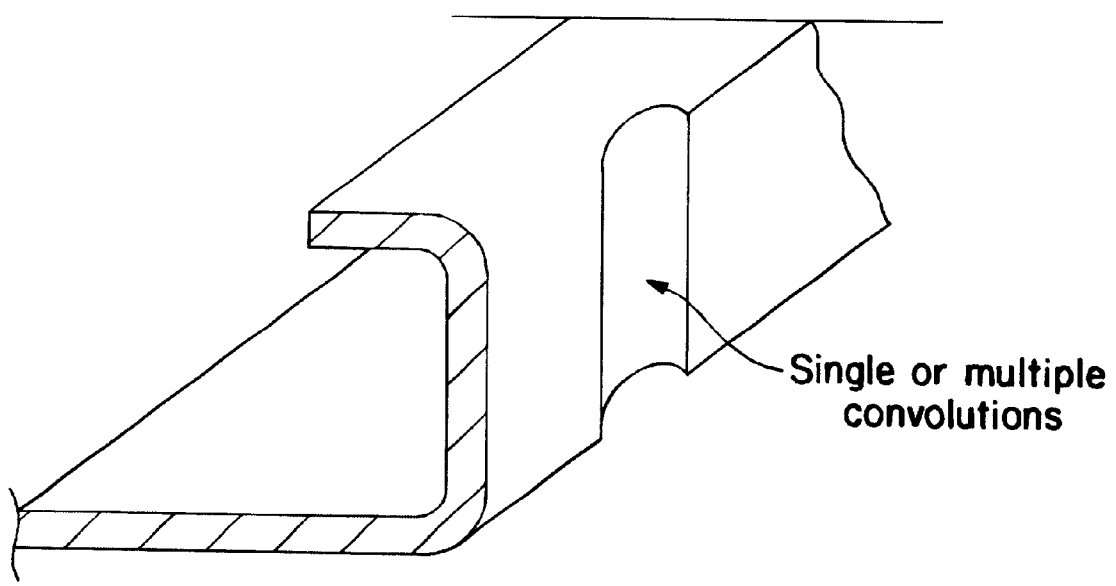
FIG. 4 is a perspective fragmentary view of a frame member, in accordance with the principles of an alternative embodiment of the invention, employing one or more "radially" extending convolutions.

An alternative embodiment of the invention is shown in FIG. 4, wherein convolutions are provided in the frames, which extend from inward positions, adjacent the longitudinal attachment webs that connect the frames to the duct ends (not shown), to outward positions adjacent the longitudinal attachment webs that connect the frames to the fabric expansion joint belt (not shown). Such a construction is also believed to alleviate thermally induced stresses and strains, although not to the extent of the circumferentially extending convolutions of the embodiments of FIGS. 2 and 3.

It is understood that the particular cross-sectional configuration of the convolutions illustrated herein are by way of example only, are not intended to limit the invention to the embodiments herein, and may be readily modified by one of ordinary skill in the art, having the present disclosure before them. For example, the convolutions may be semi-circular, elliptical, parabolic, or even triangular or trapezoidal.

The frames for expansion joints discussed herein are described and illustrated in the environment of a duct having a generally rectangular cross-section (when looking at a section of the duct end-on). However, the frame structure can be readily employed with ducts that have other cross-sectional configurations, such as polygonal, circular, elliptical, etc. Each such frame can be stamped, cast, extruded, etc. to have a shape to correspond to the cross-section of the duct to which it will be applied, using ordinary design and manufacturing techniques, by one of ordinary skill in the art, having the present disclosure before them, without departing from the scope of the invention.

The frames for expansion joints discussed herein are also described and illustrated in the environment of the planes P1, P2 of the frames (see FIG. 2) being generally perpendicular to the surfaces of the duct ends (and also parallel to one another), with their convolutions, in turn, being generally perpendicular (planes P3 and P4) to planes P1, P2. In alternative embodiments of the invention, planes P1, P2 may be at oblique angles to the surfaces of the duct ends and/or at oblique angles to one another. In addition, in these alternative embodiments, planes P3, P4 may remain perpendicular to their respective planes P1, P2, or they may be at oblique angles relative to their respective planes P1, P2. Again, such modifications may be readily achieved by one of ordinary skill in the art, having the present disclosure before them, without departing from the scope of the present invention.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

We claim:

1. An expansion joint for flexibly connecting first and second duct ends, the expansion joint having a longitudinal axis and a periphery, the expansion joint comprising:

a first frame member, operably connected to, and circumferentially surrounding at least a portion of the first duct end, the first frame member further extending outwardly from the first duct end;

the first frame member including a first attachment web disposed adjacent the first duct end, a flange extending substantially away from the first duct end, and a second attachment web disposed at a position removed from the first duct end, the flange joining the first and second attachment webs;

a second frame member, operably connected to, and circumferentially surrounding at least a portion of the second duct end, the second frame member further extending outwardly from the second duct end;

the second frame member including a first attachment web disposed adjacent the second duct end, a flange extending substantially away from the second duct end, and a second attachment web disposed at a position removed from the second duct end, the flange joining the first and second attachment webs, a flexible sealing cover peripherally circumferentially surrounding the gap between the first and second duct ends, and affixed to the second attachment webs of the first and second frame members, substantially sealingly connecting the first duct end to the second duct end, at least one of the flanges of at least one of the first and second frame members being provided with at least one convolution therein, for accommodating stresses and strains induced in the respective at least one of the first and second frame members, and permit flexing of said respective at least one of the first and second frame members.

2. The expansion joint according to claim 1, wherein the at least one convolution projects substantially longitudinally substantially parallel to the longitudinal axis of the expansion joint.

3. The expansion joint according to claim 1, wherein the at least one convolution proceeds circumferentially through the at least one of the first and second frame members.

4. The expansion joint according to claim 1, wherein the at least one convolution comprises two or more convolutions in at least one of the first and second frame members.

5. The expansion joint according to claim 1, wherein at least one of the first and second frame members is monolithically formed.

6. The expansion joint according to claim 1, wherein at least one of the first and second frame members is fabricated from separate first and second attachment web members and a flange member.

7. A frame member construction for supporting an end of a fabric expansion joint belt, for an expansion joint for a gas duct of the type wherein first and second duct ends are connected to first and second frame member, each frame member having a first attachment web disposed adjacent a respective duct end, a flange extending substantially away from the respective duct end, and a second attachment web disposed at a position removed from the respective duct end, the flange joining the first and second attachment webs, and wherein end edges of the fabric expansion joint belt are affixed to respective second attachment webs of the first and second frame members, the frame member construction comprising at least one convolution formed in the flange joining the first and second frame members.

8. The frame member construction according to claim 7, wherein the at least one convolution projects substantially longitudinally substantially parallel to the longitudinal axis of the expansion joint.

9. The frame member construction according to claim 7, wherein the at least one convolution proceeds circumferentially through the frame member.

10. The frame member construction according to claim 7, wherein the at least one convolution comprises two or more convolutions in the frame member.

11. The frame member construction according to claim 7, wherein the frame member is monolithically formed.

12. The frame member construction to claim 7, wherein the frame member is fabricated from separate first and second attachment web members and a flange member.

13. The expansion joint according to claim 1, wherein at least one of the first and second frame members has a configuration selected from the following group: rectangular, polygonal, circular, oval.

14. The frame member construction according to claim 7, wherein the frame member has a configuration selected from the following group: rectangular, polygonal, circular, oval.

15. The expansion joint according to claim 1, wherein at least one of the first and second frame members generally extends in a plane perpendicular to the longitudinal axis of the expansion joint.

16. The expansion joint according to claim 1, wherein at least one of the first and second frame members generally extends in a plane oblique to the longitudinal axis of the expansion joint.

17. The frame member construction according to claim 7, wherein the frame member is operably configured to be connected to a duct end and extend generally in a plane perpendicular to a longitudinal axis of the duct end.

18. The frame member construction according to claim 7, wherein the frame member is operably configured to be connected to a duct end and extend generally in a plane oblique to a longitudinal axis of the duct end.

* * * * *